US010907658B1

(12) United States Patent
Corson et al.

(10) Patent No.: US 10,907,658 B1
(45) Date of Patent: Feb. 2, 2021

(54) FLUIDIC POWER TRANSMISSION APPARATUSES FOR HAPTICS SYSTEMS AND RELATED METHODS

(71) Applicant: Facebook Technologies, LLC, Menlo Park, CA (US)

(72) Inventors: Nicholas Roy Corson, Woodinville, WA (US); Adam Ahne, Snohomish, WA (US); Daniele Piazza, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/431,708

(22) Filed: Jun. 4, 2019

(51) Int. Cl.
*F15B 7/08* (2006.01)
*F15B 21/14* (2006.01)
*F15B 15/14* (2006.01)
*F04B 19/22* (2006.01)
*F04B 43/02* (2006.01)
*F04B 43/08* (2006.01)
*F04B 9/00* (2006.01)

(52) U.S. Cl.
CPC .................. *F15B 7/08* (2013.01); *F04B 9/00* (2013.01); *F04B 19/22* (2013.01); *F04B 43/02* (2013.01); *F04B 43/08* (2013.01); *F15B 15/14* (2013.01); *F15B 21/14* (2013.01)

(58) Field of Classification Search
CPC ...... A63F 2300/8082; F15B 7/02; F15B 7/08; A61B 34/37; A61B 2090/064; A61B 2017/00539
See application file for complete search history.

(56) References Cited

U.S. PATENT DOCUMENTS

| 6,637,200 B2* | 10/2003 | Barba | F04B 43/046 |
| | | | 417/413.2 |
| 7,138,976 B1* | 11/2006 | Bouzit | G06F 3/014 |
| | | | 345/156 |
| 7,926,269 B2* | 4/2011 | Buerger | F15B 1/021 |
| | | | 60/592 |
| 9,229,530 B1* | 1/2016 | Wu | G06F 3/016 |
| 9,646,469 B2* | 5/2017 | Gwilliam | G06F 3/016 |
| 9,675,418 B2* | 6/2017 | Doyle | F15B 7/00 |
| 9,814,295 B2* | 11/2017 | Chiasson | A45D 40/24 |
| 2006/0228240 A1* | 10/2006 | Schroeder | F04B 43/1223 |
| | | | 417/476 |
| 2014/0212314 A1* | 7/2014 | Baron | F04B 43/1223 |
| | | | 417/477.7 |
| 2015/0159643 A1* | 6/2015 | Koob | F04B 43/1253 |
| | | | 417/477.3 |
| 2015/0323135 A1* | 11/2015 | Smith | F17C 13/04 |
| | | | 137/14 |
| 2016/0274662 A1* | 9/2016 | Rimon | G06F 3/016 |

(Continued)

*Primary Examiner* — Thomas E Lazo
(74) *Attorney, Agent, or Firm* — FisherBroyles, LLP

(57) ABSTRACT

The disclosed fluidic power transmission apparatus may include a conduit having an internal volume for containing a fluid, a reciprocating input mechanism for alternating at least one of fluid flow or fluid pressure within the conduit, the reciprocating input mechanism being in fluid communication with the internal volume of the conduit, and a slave unit coupled to the conduit such that the slave unit is positioned to be driven by the alternating fluid flow or fluid pressure within the internal volume of the conduit. Various other methods and systems are also disclosed.

20 Claims, 11 Drawing Sheets

(56) References Cited

U.S. PATENT DOCUMENTS

2016/0296838 A1\* 10/2016 Goetgeluk ............ A63F 13/285
2017/0014998 A1\* 1/2017 Langenfeld .............. B25J 9/126
2017/0268496 A1\* 9/2017 McIntyre ............ F04B 43/1261
2017/0322626 A1\* 11/2017 Hawkes .................. G06F 3/016

\* cited by examiner

FLUIDIC POWER TRANSMISSION APPARATUSES FOR HAPTICS SYSTEMS AND RELATED METHODS

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
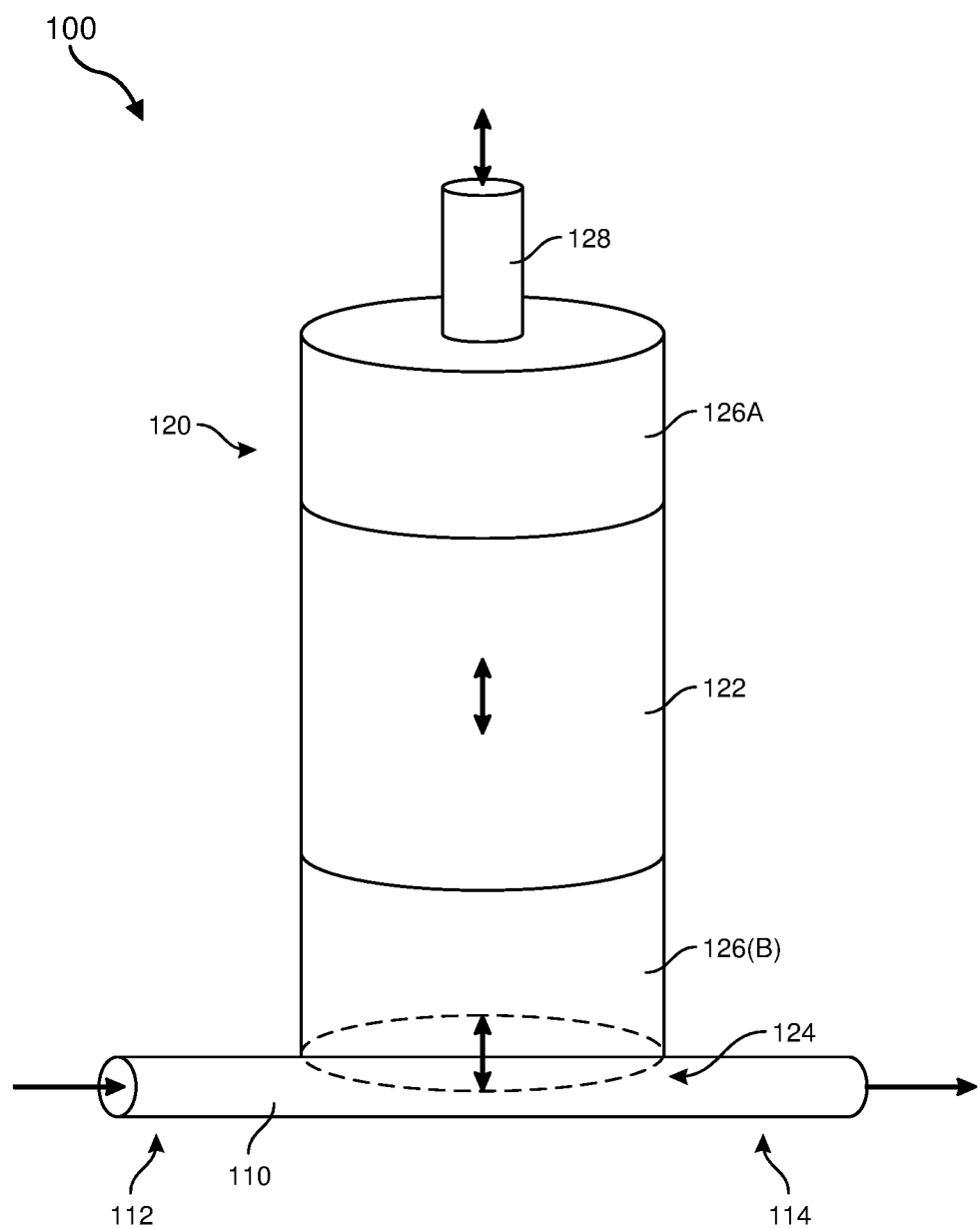
FIG. 1 is an illustration of an example fluidic control system that may be used in connection with embodiments of this disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Haptic feedback mechanisms are designed to provide a physical sensation (e.g., vibration, pressure, heat, etc.) as an indication to a user. For example, vibrotactile devices include devices that may vibrate to provide haptic feedback to a user of a device. Some modern mobile devices (e.g., cell phones, tablets, mobile gaming devices, gaming controllers, etc.) include a vibrotactile device that informs the user through a vibration that an action has been taken. The vibration may indicate to the user that a selection has been made or a touch event has been sensed. Vibrotactile devices may also be used to provide an alert or signal to the user.

Various types of vibrotactile devices exist, such as piezoelectric devices, eccentric rotating mass devices, and linear resonant actuators. Such conventional vibrotactile devices may include one or more elements that vibrate upon application of an electrical voltage. In the case of piezoelectric devices, an applied voltage may induce bending or other displacement in a piezoelectric material. Eccentric rotating mass devices induce vibration by rotating an off-center mass around an axle of an electromagnetic motor. Linear resonant actuators may include a mass on an end of a spring that is driven by a linear actuator to cause vibration.

Haptic feedback may be employed in artificial-reality systems (e.g., virtual-reality systems, augmented-reality systems, mixed-reality systems, hybrid-reality systems), such as by providing one or more haptic feedback mechanisms in a glove or other wearable device. If multiple haptic feedback mechanisms are employed, systems to supply energy to the mechanisms are typically designed to accommodate the largest expected load (e.g., full simultaneous operation of the haptic feedback mechanisms, including the mechanism(s) requiring the most energy). Thus, energy supply systems are often somewhat inefficient when operating at a load that is lower than the largest expected load.

The present disclosure is generally directed to fluidic power transmission apparatuses, methods of manufacturing haptic feedback systems, and methods for driving haptic feedback systems. As will be explained in greater detail below, embodiments of the present disclosure include a fluidic power transmission apparatus that includes a conduit having an internal volume for containing a fluid, a reciprocating input mechanism for alternating fluid flow and/or fluid pressure within the conduit, and a slave unit coupled to the conduit. The reciprocating input mechanism may be in fluid communication with the internal volume of the conduit. The slave unit may be positioned to be driven by the alternating fluid flow and/or fluid pressure within the internal volume of the conduit. Haptic feedback systems, such as a glove or other wearable device, may incorporate such fluidic power transmissions. The slave unit(s) may be tailored (e.g., sized and configured) to draw an appropriate amount of power from the alternating fluid flow and/or fluid pressure to drive a device (e.g., a haptic feedback component). Thus, the disclosed fluidic power transmission apparatuses may allow for efficient power transmission from the reciprocating input mechanism to the slave unit and may enable the use of appropriately sized components for wearable applications.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
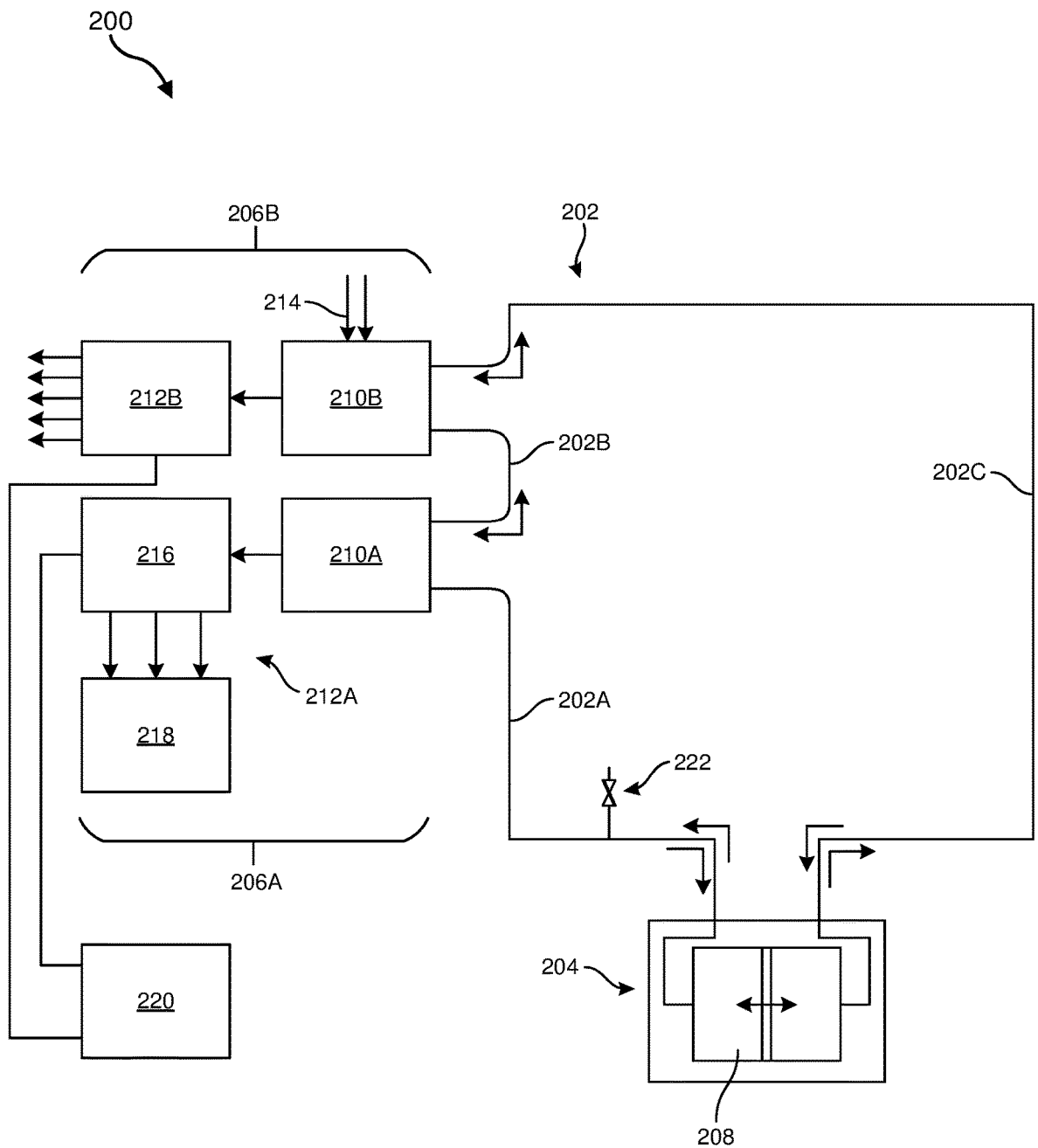
FIG. 2 is a schematic view of a fluidic power transmission apparatus, according to at least one embodiment of the present disclosure.

The following will provide, with reference to FIG. 1, detailed descriptions of fluidic valves that may be employed with embodiments of the present disclosure. With reference to FIG. 2, detailed descriptions of example fluidic power transmission apparatuses will be provided. With reference to FIGS. 3A-3E, example fluidic power mechanisms will be described. The following will also provide, with reference to FIGS. 4 and 5, detailed descriptions of methods of driving and manufacturing haptic feedback systems. With reference to FIGS. 6-11, detailed descriptions of example artificial-reality systems will be provided, which may be implemented with embodiments of the present disclosure.

The present disclosure may include haptic fluidic systems that involve the control (e.g., stopping, starting, restricting, increasing, etc.) of fluid flow through a fluid channel. The control of fluid flow may be accomplished with a fluidic valve. FIG. 1 shows a schematic diagram of a fluidic valve 100 for controlling flow through a fluid channel 110, according to at least one embodiment of the present disclosure. Fluid from a fluid source (e.g., a pressurized fluid source, a fluid pump, etc.) may flow through the fluid channel 110 from an inlet port 112 to an outlet port 114, which may be operably coupled to, for example, a fluid-driven mechanism, another fluid channel, or a fluid reservoir.

The fluidic valve 100 may include a gate 120 for controlling the fluid flow through the fluid channel 110. The gate 120 may include a gate transmission element 122, which may be a movable component that is configured to transmit an input force, pressure, or displacement to a restricting region 124 to restrict or stop flow through the fluid channel 110. Conversely, in some examples, application of a force, pressure, or displacement to the gate transmission element 122 may result in opening the restricting region 124 to allow or increase flow through the fluid channel 110. The force, pressure, or displacement applied to the gate transmission element 122 may be referred to as a gate force, gate pressure, or gate displacement. The gate transmission element 122 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 1, the gate 120 of the fluidic valve 100 may include one or more gate terminals, such as an input gate terminal 126A and an output gate terminal 126B (collectively referred to herein as "gate terminals 126") on opposing sides of the gate transmission element 122. The gate terminals 126 may be elements for applying a force (e.g., pressure) to the gate transmission element 122. By way of example, the gate terminals 126 may each be or include a fluid chamber adjacent to the gate transmission element 122. Alternatively or additionally, one or more of the gate terminals 126 may include a solid component, such as a lever, screw, or piston, that is configured to apply a force to the gate transmission element 122.

In some examples, a gate port 128 may be in fluid communication with the input gate terminal 126A for applying a positive or negative fluid pressure within the input gate terminal 126A. A control fluid source (e.g., a pressurized fluid source, a fluid pump, etc.) may be in fluid communication with the gate port 128 to selectively pressurize and/or depressurize the input gate terminal 126A. In additional embodiments, a force or pressure may be applied at the input gate terminal 126A in other ways, such as with a piezoelectric element or an electromechanical actuator, etc.

In the embodiment illustrated in FIG. 1, pressurization of the input gate terminal 126A may cause the gate transmission element 122 to be displaced toward the restricting region 124, resulting in a corresponding pressurization of the output gate terminal 126B. Pressurization of the output gate terminal 126B may, in turn, cause the restricting region 124 to partially or fully restrict to reduce or stop fluid flow through the fluid channel 110. Depressurization of the input gate terminal 126A may cause the gate transmission element 122 to be displaced away from the restricting region 124, resulting in a corresponding depressurization of the output gate terminal 126B. Depressurization of the output gate terminal 126B may, in turn, cause the restricting region 124 to partially or fully expand to allow or increase fluid flow through the fluid channel 110. Thus, the gate 120 of the fluidic valve 100 may be used to control fluid flow from the inlet port 112 to the outlet port 114 of the fluid channel 110.

FIG. 2 is a schematic diagram of a fluidic power transmission apparatus 200 (also referred to herein as "apparatus 200" for simplicity), which may be useful for haptics applications (among other applications). The apparatus 200 may include a conduit 202 that has an internal volume for containing a fluid (e.g., a liquid and/or a gas), a reciprocating input mechanism 204 for alternating (e.g., alternating between positive and negative and/or between different magnitudes) at least one of fluid flow or fluid pressure within the conduit, and at least one slave unit 206A, 206B (collectively referred to as "slave unit(s) 206") coupled to the conduit to be driven by the alternating fluid flow or fluid pressure. In a haptics system incorporating the apparatus 200, the reciprocating input mechanism 204 may be located in a position to be supported by a user's body, such as on a wrist, arm, back, chest, shoulder, etc. The slave unit(s) 206 may be located at or proximate to a position of intended haptics feedback, such as on a hand, palm, finger, etc. The conduit 202 may extend from the reciprocating input mechanism 204 to the slave unit(s) 206.

In some examples, the conduit 202 may be configured to contain an incompressible fluid, such as water. The conduit 202 may be a flexible (e.g., bendable) conduit, but may be substantially rigid in a radial direction to withstand pressurization of the fluid therein without significant expansion. For example, the conduit 202 may be formed of a polymer material, a metal material, a composite (e.g., a fibrous material (e.g., carbon fiber, glass fiber, polymer fiber, textile, metal wire, etc.) and a polymer (e.g., elastomer, thermoplastic, etc.)) material, or any suitable combination thereof.

As illustrated in FIG. 2, the conduit 202 may be a fluidic circuit composed of multiple segments, such as a first conduit segment 202A extending from the reciprocating input mechanism 204 to a first slave unit 206A, a second conduit segment 202B extending between the first slave unit 206A to a second slave unit 206B, and a third conduit segment 202C extending from the second slave unit 206B back to the reciprocating input mechanism 204. In this example arrangement, the first slave unit 206A and the second slave unit 206B may be coupled to the conduit 202 in series. In additional examples, the slave units 206 may be coupled to the conduit 202 in parallel (e.g., with the first conduit segment 202A extending from the reciprocating input mechanism 204 to both of the slave units 206, and the third conduit segment 202C extending from both of the slave units 206 to the reciprocating input mechanism 204). In this parallel arrangement, the second conduit segment 202B may be absent. In further embodiments, conduit 202 may extend from the reciprocating input mechanism 204 to the slave unit(s) 206 without any return segment. Thus, in some examples, the third conduit segment 202C may be absent, such that only the first conduit segment 202A is coupled to the reciprocating input mechanism 204.

The conduit segments 202A, 202B, and 202C may respectively have a first internal volume, a second internal volume, and a third internal volume. The internal volumes of the conduit segments 202A, 202B, and 202C may, in some examples, be in fluid communication with each other. In additional examples, the respective internal volumes of the conduit segments 202A, 202B, and 202C may be fluidically isolated from each other.

The reciprocating input mechanism 204 may include an internal volume 208 that may be operably coupled to (e.g., in fluid communication with) an internal volume of the conduit 202. As the reciprocating input mechanism 204 is activated, a fluid flow and/or fluid pressure of the fluid within the conduit 202 may be alternated (e.g., reciprocated), such as between a positive and a negative value/direction or between a first magnitude and a second magnitude. Some example mechanisms that may be suitable for the reciprocating input mechanism 204 are illustrated in FIGS. 3A-3E and are described below.

The first slave unit 206A may include a first slave pump 210A and a first fluidic haptic feedback component 212A that is configured to be driven by the first slave pump 210A and to provide haptic feedback to a user. Similarly, the second slave unit 206B may include a second slave pump 210B and a second fluidic haptic feedback component 212B that is configured to be driven by the second slave pump 210B and to provide haptic feedback to the user. The first and second slave pumps 210A, 210B are also collectively referred to as "slave pump(s) 210" and the first and second fluidic haptic feedback components 212A, 212B are also collectively referred to as "fluidic haptic feedback component(s) 212" herein. The slave pump(s) 210 may be configured to receive energy from the alternating fluid flow and/or fluid pressure within the conduit 202 and convert that energy for driving the respective fluidic haptic feedback component(s) 212. Example mechanisms that may be used for the slave pump(s) 210 are described below with reference to FIGS. 3A-3E.

Each of the slave pumps 210 may be tailored to the respective fluidic haptic feedback component 212 that is driven thereby. For example, if the first fluidic haptic feedback component 212A requires a relatively high input energy for operation, the corresponding first slave pump 210A may be configured (e.g., sized) to convert a relatively high portion of energy from the alternating fluid flow and/or fluid pressure in the conduit 202 for use by the first fluidic haptic feedback component 212A. Conversely, if the second fluidic haptic feedback component 212B requires a relatively low input energy for operation, the corresponding second slave pump 210B may be configured (e.g., sized) to convert a relatively low portion of energy from the alternating fluid flow and/or fluid pressure in the conduit 202. Similarly, the slave pump(s) 210 may be configured to convert energy from the alternating fluid flow and/or fluid pressure in the conduit 202 in a different way. By way of illustration, the first slave pump 210A may be configured to convert energy from the alternating fluid flow and/or fluid pressure in the conduit 202 to electricity, which may then be used to operate the first fluidic haptic feedback component 212A. The second slave pump 210B may be configured to use energy from the alternating fluid flow and/or fluid pressure in the conduit 202 to pump ambient air 214 and to provide a pressurized air source to operate the second fluidic haptic feedback component 212B. Thus, each of the slave units 206 may be tailored in size, type, and capability for a corresponding one of the fluidic haptic feedback components 212, which may improve an efficiency (e.g., in size, energy consumption, etc.) of the apparatus 200 compared to conventional fluidic systems that may use one energy source to operate multiple different components.

The fluidic haptic feedback components 212 may include any device that is configured to employ a fluid (e.g., a gas, a liquid, or a combination thereof) to provide haptic feedback to a user. By way of example and not limitation, the fluidic haptic feedback components 212 may include an inflatable bladder, a fluidic vibrotactile actuator, a fluid-driven fan with an eccentric rotating mass, a fluid-driven skin-stretch mechanism, a haptic jammer, a fluidic logic device, a fluidic amplifier, a fluidic dampener, an array of one or more of these examples, and/or any suitable combination of these examples. By way of illustration, FIG. 2 illustrates the first fluidic haptic feedback component 212A as a fluidic control subsystem 216 (e.g., a fluidic logic device) that is coupled to and driven by the first slave pump 210A and a skin-stretch mechanism 218 that is coupled to and driven by the fluidic control subsystem 216. The second fluidic haptic feedback component 212B is illustrated in FIG. 2 as a bubble array that is coupled to and driven by the second slave pump 210B.

In some embodiments, the apparatus 200 may also include a global fluidic control subsystem 220 (e.g., a global fluidic logic device), which may be configured to control operation of one or more of the fluidic haptic feedback components 212. For example, power may be provided by the slave pumps 210 to operate the fluidic haptic feedback components 212, while control of the fluidic haptic feedback components 212 may be provided by the global fluidic control subsystem 220.

In some examples, the apparatus 200 may also include at least one fluidic access port 222 for providing fluidic access to the conduit 202. For example, the fluidic access port 222 may include a valve, pressurized tank, etc. The fluidic access port 222 may be configured for filling the conduit 202 with a desired fluid, for purging an undesired fluid, for cleaning an interior of the conduit 202, for accommodating expansion and/or contraction of the fluid due to changes in pressure or temperature, for sensing a fluid pressure within the conduit 202 with a pressure sensor, etc.

FIGS. 3A-3E illustrate various respective fluidic power mechanisms 300A, 300B, 300C, 300D, 300E (collectively referred to as "fluidic power mechanisms 300"). The fluidic power mechanisms 300 may be employed as the reciprocating input mechanism 204 and/or as the slave pumps 210 (or a portion thereof) described above with relation to FIG. 2, depending on the configuration and use of the fluidic power mechanisms 300. The fluidic power mechanisms 300 will first be explained in the context of use as the reciprocating input mechanism 204.

Figure 3A:
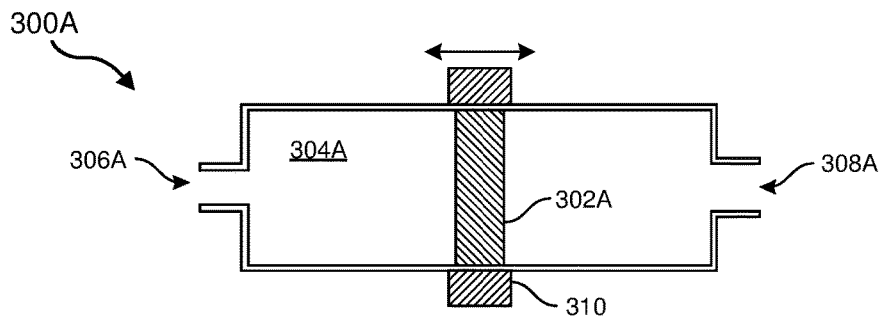
FIGS. 3A-3E are diagrams illustrating various example fluidic power mechanisms, according to some embodiments of the present disclosure.

Referring to FIG. 3A, the first fluidic power mechanism 300A may include a piston 302A that is positioned and movable within a fluid chamber 304A. A first fluid port 306A may provide fluid communication to the fluid chamber 304A on a first side of the piston 302A, and a second fluid port 308A may provide fluid communication to the fluid chamber 304A on a second, opposite side of the piston 302A. By way of example and not limitation, the first fluid port 306A may be in fluid communication with the first conduit segment 202A and the second fluid port 308A may be in fluid communication with the third conduit segment 202C of the apparatus 200 shown in FIG. 2.

Referring again to FIG. 3A, the piston 302A may include a magnetic or magnetically sensitive (e.g., ferromagnetic) material. The piston 302A may be driven by reciprocating motion of a magnetic element 310 along an exterior of the fluid chamber 304A. Movement of the magnetic element 310 may, in turn, be induced by an electromechanical actuator, such as a solenoid, a linear actuator, a roller mechanism, a rotating motor, a cam, any suitable combination thereof, etc. Alternatively or additionally, the magnetic element 310 may represent an electromagnetic coil that is configured to induce an alternating (e.g., in polarity) magnetic field to drive the piston 302A in a back-and-forth motion. In any case, as the piston 302A is driven back and forth in an alternating fashion by the magnetic element 310, fluid may alternately be forced into and out of the fluid chamber 304A through the first fluid port 306A and simultaneously out of and into the fluid chamber 304A through the second fluid port 308A. Thus, the first fluidic power mechanism 300A may be configured to alternate at least one of fluid flow and/or fluid pressure within the conduit 202 (FIG. 2).

Referring to FIG. 3A in conjunction with FIG. 2, depending on an expected load from elements (e.g., the slave unit(s) 206) drawing power from the alternating fluid flow and/or fluid pressure, the piston 302A may be driven by the magnetic element 310 with a variable power. For example, when a relatively low load is expected, then an actuator driving the magnetic element 310 may be operated with a decreased power (e.g., torque). When a relatively high load is expected (e.g., when multiple slave units 206 are to be simultaneously driven), then the actuator driving the magnetic element 310 may be operated with an increased power. The variable driving power of the first fluidic power mechanism 300A may result in a corresponding variable fluid pressure and/or variable speed of alternation (e.g., strokes per unit time) of fluid flow within the conduit 202, which may be used by the slave unit(s) 206 as needed. However, since the fluid flow and/or fluid pressure is alternating, an increased expected load may not require any increased volume of fluid in the apparatus 200. In addition, the amount of power input into the system may efficiently be varied depending on an expected load, rather than inputting power to accommodate a highest expected load, as in at least some conventional systems.

Figure 3B:
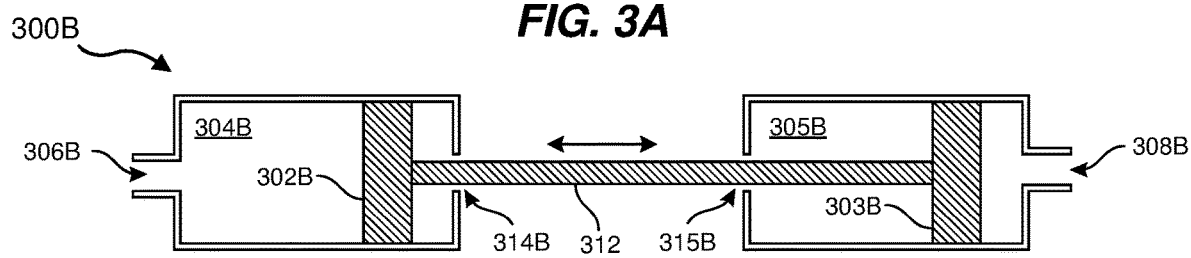

FIG. 3B illustrates a second fluidic power mechanism 300B, according to additional embodiments of the present disclosure. The second fluidic power mechanism 300B may have some similar or common elements relative to the first fluidic power mechanism 300A. For example, the second fluidic power mechanism 300B may include a first piston 302B that is positioned and movable within a first fluid chamber 304B. A first fluid port 306B may provide fluid communication to the first fluid chamber 304B on a side of the first piston 302B. The second fluidic power mechanism 300B may also include a second piston 303B that is positioned and movable within a second fluid chamber 305B. A second fluid port 308B may provide fluid communication to the second fluid chamber 305B on a side of the second piston 303B. A drive shaft 312 may be coupled to and may extend between the first piston 302B and the second piston 303B. In some examples, the drive shaft 312 may pass through a first aperture 314B in the first fluid chamber 304B and through a second aperture 315B in the second fluid chamber 305B. The first fluid port 306B may be in fluid communication with the first conduit segment 202A and the second fluid port 308B may be in fluid communication with the third conduit segment 202C of the apparatus 200 shown in FIG. 2.

Referring again to FIG. 3B, the drive shaft 312 may be driven by any suitable actuator, such as a solenoid, a linear actuator, a roller mechanism, a rotating motor, a cam, any suitable combination thereof, etc. Reciprocating movement of the drive shaft 312 may result in corresponding alternating (e.g., back-and-forth) movement of the first piston 302B and of the second piston 303B. The alternating movement of the first piston 302B may force fluid into and out of the first fluid chamber 304B through the first fluid port 306B and simultaneously the alternating movement of the second piston 303B may force fluid out of and into the second fluid chamber 305B through the second fluid port 308B.

The second fluidic power mechanism 300B may enable similar or the same functions as the first fluidic power mechanism 300A discussed above and may offer some or all of the same benefits and improvements over conventional systems. In addition, the second fluidic power mechanism 300B may provide alternative or additional manners of activation due to the presence of the exposed drive shaft 312.

Figure 3C:
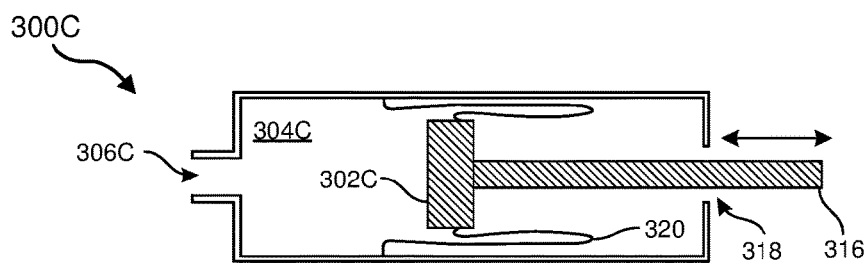

FIG. 3C illustrates a third fluidic power mechanism 300C, according to additional embodiments of the present disclosure. The third fluidic power mechanism 300C may have some similar or common elements relative to the first fluidic power mechanism 300A. For example, the third fluidic power mechanism 300C may include a piston 302C that is positioned and movable within a fluid chamber 304C. A fluid port 306C may provide fluid communication to the fluid chamber 304C on a side of the piston 302C. The third fluidic power mechanism 300C may also include a drive shaft 316 that is coupled to the piston 302C and that may pass through an aperture 318 in the fluid chamber 304C. The fluid port 306C may be in fluid communication with the first conduit segment 202A of the apparatus 200 shown in FIG. 2.

A flexible (e.g., elastomeric) seal 320 may be coupled to the piston 302C and to an interior wall of the fluid chamber 304C, as shown in FIG. 3C. The flexible seal 320 may be sized and configured to enable the piston 302C to move back and forth within the fluid chamber 304C while maintaining a fluid seal between the piston 302C and the fluid chamber 304C. The flexible seal 320 may reduce the friction between the piston 302C and the internal walls of the fluid chamber 304C compared to embodiments in which pistons directly or indirectly (e.g., via an O-ring) abut against the internal walls of the respective fluid chambers. The reduced friction provided by the flexible seal 320 may enable the third fluidic power mechanism 300C to be operated more efficiently, (e.g., with a reduced input power).

In embodiments employing the third fluidic power mechanism 300C, the conduit 202 may extend therefrom to slave unit(s) 206 but may not return to the third fluidic power mechanism 300C (e.g., such a system may lack the third conduit segment 202C). Alternatively, another piston within another fluid chamber may be coupled to an end of the drive shaft 316 opposite the piston 302C, similar to the embodiment shown in FIG. 3B.

Figure 3D:
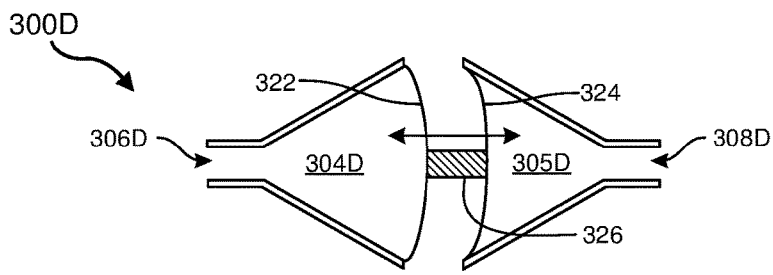

FIG. 3D illustrates a fourth fluidic power mechanism 300D, according to additional embodiments of the present disclosure. The fourth fluidic power mechanism 300D may have some similar or common elements relative to the first fluidic power mechanism 300A. For example, the fourth fluidic power mechanism 300D may include a first expandable fluid chamber 304D in fluid communication with a first fluid port 306D. The first expandable fluid chamber 304D may be at least partially defined by a first flexible endplate 322. A second expandable fluid chamber 305D may be in fluid communication with a second fluid port 308D. The second expandable fluid chamber 305D may be at least partially defined by a second flexible endplate 324. A drive shaft 326 may be coupled to and extend between the first flexible endplate 322 and the second flexible endplate 324. The first fluid port 306D may be in fluid communication with the first conduit segment 202A and the second fluid port 308D may be in fluid communication with the third conduit segment 202C of the apparatus 200 shown in FIG. 2.

The flexible endplates 322, 324 may include a material that is capable of repeated flexing (e.g., bending, expanding, contracting, etc.) across an expected stroke without mechanical failure. For example, the material of the flexible endplates 322, 324 may include a metal material, a polymer material, a composite (e.g., fiber-matrix) material, any combination thereof, etc.

The drive shaft 326 may be driven by any suitable actuator, such as a solenoid, a linear actuator, a roller mechanism, a rotating motor, a cam, any suitable combination thereof, etc. Reciprocating movement of the drive shaft 326 may result in corresponding alternating (e.g., back-and-forth) movement of the first flexible endplate 322 and of the second flexible endplate 324, as well as corresponding expansion and contraction of the expandable fluid chambers 304D, 305D. Thus, the alternating movement of the drive shaft 326 may force fluid into and out of the first expandable fluid chamber 304D through the first fluid port 306D and simultaneously may force fluid out of and into the second expandable fluid chamber 305D through the second fluid port 308D.

The fourth fluidic power mechanism 300D may enable similar or the same functions as the first fluidic power mechanism 300A discussed above and may offer some or all of the same benefits and improvements over conventional systems. In addition, the fourth fluidic power mechanism 300D may provide alternative or additional manners of activation. Moreover, since there may be no parts (e.g., pistons, drive shafts, etc.) moving within and relative to the expandable fluid chambers 304D, 305D, friction may be reduced, and certain failure modes may be inhibited (e.g., reduced or eliminated). Also, additional options may be available for a shape of the expandable fluid chambers 304D, 305D compared to embodiments that employ a piston in a chamber, since sidewalls of the expandable fluid chambers 304D, 305D may be in non-parallel orientations relative to each other (as shown by way of example in FIG. 3D).

Figure 3E:
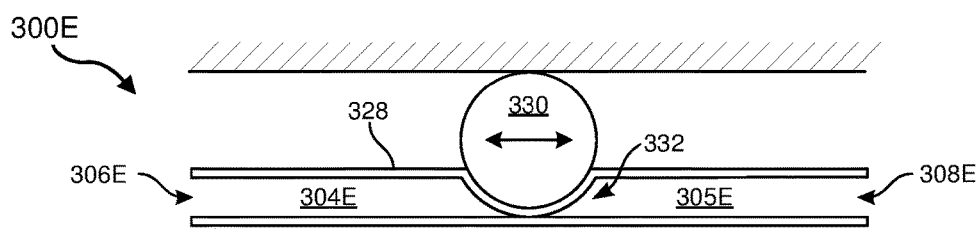

FIG. 3E illustrates a fifth fluidic power mechanism 300E, according to additional embodiments of the present disclosure. The fifth fluidic power mechanism 300E may include a first fluid chamber 304E with a first fluid port 306E providing fluid communication to the first fluid chamber 304E. The fifth fluidic power mechanism 300E may also include a second fluid chamber 305E with a second fluid port 308E providing fluid communication to the second fluid chamber 305E. At least a portion of sidewalls 328 of the fluid chambers 304E and 305E may be flexible (e.g., compressible). In other words, the fifth fluidic power mechanism 300E may include a compressible tube. A roller 330 may be positioned to compress the flexible portion of the sidewalls 328, forming a restricting region 332 between the first fluid chamber 304E and the second fluid chamber 305E. The first fluid port 306E may be in fluid communication with the first conduit segment 202A (or may be a continuation of the first conduit segment 202A) and the second fluid port 308E may be in fluid communication with the third conduit segment 202C (or may be a continuation of the third conduit segment 202C) of the apparatus 200 shown in FIG. 2.

In operation, the roller 330 may be moved (e.g., rolled) back and forth to move the restricting region 332 back and forth, which may result in corresponding expansion and contraction of the fluid chambers 304E, 305E. The roller 330 may be moved by any suitable actuator, such as a solenoid, a linear actuator, a gear, a roller mechanism, a rotating motor, a cam, any suitable combination thereof, etc.

Although FIG. 3E illustrates the fluid chambers 304E, 305E as generally having a same size as the fluid ports 306E, 308E, the present disclosure is not so limited. For example, in additional embodiments, the fluid chambers 304E, 305E may be enlarged relative to the fluid ports 306E, 308E.

The fifth fluidic power mechanism 300E may enable similar or the same functions as the first fluidic power mechanism 300A discussed above and may offer some or all of the same benefits and improvements over conventional systems. In addition, the fifth fluidic power mechanism 300E may provide alternative or additional manners of activation. Moreover, since there may be no parts (e.g., pistons, drive shafts, etc.) moving within and relative to the fluid chambers 304E, 305E, friction may be reduced, and certain failure modes may be inhibited (e.g., reduced or eliminated). Also, additional options may be available for a shape of the fluid chambers 304E, 305E compared to embodiments that employ a piston in a chamber.

The fluidic power mechanisms 300 shown in FIGS. 3A-3E may be used for the reciprocating input mechanism 204 of the apparatus 200 of FIG. 2, as described above. In addition, the fluidic power mechanisms 300 may also be configured and used to transfer power from the alternating fluid flow or fluid pressure within the conduit 202 to the slave units 206.

By way of illustration and example, the first fluidic power mechanism 300A shown in FIG. 3A may be used to transfer power from the alternating fluid flow or fluid pressure within the conduit 202 to the first slave unit 206A by connecting the first fluid port 306A to the first conduit segment 202A and the second fluid port 308A to the second conduit segment 202B. The alternating fluid flow and/or fluid pressure may force the piston 302A to move back and forth within the fluid chamber 304A. The magnetic element 310, rather than driving movement of the piston 302A, may be configured to follow the movement of the piston 302A. In turn, the movement of the magnetic element 310 may be used to drive operation of the first slave unit 206A.

By way of another example, the second fluidic power mechanism 300B shown in FIG. 3B may be used to transfer power from the alternating fluid flow or fluid pressure within the conduit 202 to the first slave unit 206A by connecting the first fluid port 306B to the first conduit segment 202A and the second fluid port 308B to the second conduit segment 202B. The alternating fluid flow and/or fluid pressure may force the first piston 302B to move back and forth within the first fluid chamber 304B. As a result, the drive shaft 312 (which may be considered as a follower shaft in this example implementation) may move back and forth, and the second piston 303B may move back and forth within the second fluid chamber 305B. The movement of the drive shaft 312 may be used to drive operation of the first slave unit 206A.

In another example, the third fluidic power mechanism 300C shown in FIG. 3C may be used to transfer power from the alternating fluid flow or fluid pressure within the conduit 202 to the first slave unit 206A by connecting the fluid port 306C to the first conduit segment 202A. The alternating fluid flow and/or fluid pressure may force the piston 302C to move back and forth within the fluid chamber 304C. As a result, the drive shaft 316 (which may be considered as a follower shaft in this example implementation) may move back and forth. The movement of the drive shaft 316 may be used to drive operation of the first slave unit 206A.

The fourth fluidic power mechanism 300D shown in FIG. 3D may be used to transfer power from the alternating fluid flow or fluid pressure within the conduit 202 to the first slave unit 206A by connecting the first fluid port 306D to the first conduit segment 202A and the second fluid port 308D to the third conduit segment 202C. The alternating fluid flow and/or fluid pressure may force the flexible endplates 322, 324 and the drive shaft 326 (which may be considered as a follower shaft in this example implementation) to move back and forth. The movement of the drive shaft 326 may be used to drive operation of the first slave unit 206A.

By way of another example, the fifth fluidic power mechanism 300E shown in FIG. 3E may be used to transfer power from the alternating fluid flow or fluid pressure within the conduit 202 to the first slave unit 206A by connecting the first fluid port 306E to the first conduit segment 202A and the second fluid port 308E to the third conduit segment 202C. The alternating fluid flow and/or fluid pressure may force the restricting region 332 and roller 330 to move back and forth. The movement of the roller 330 may be used to drive operation of the first slave unit 206A.

Figure 4:
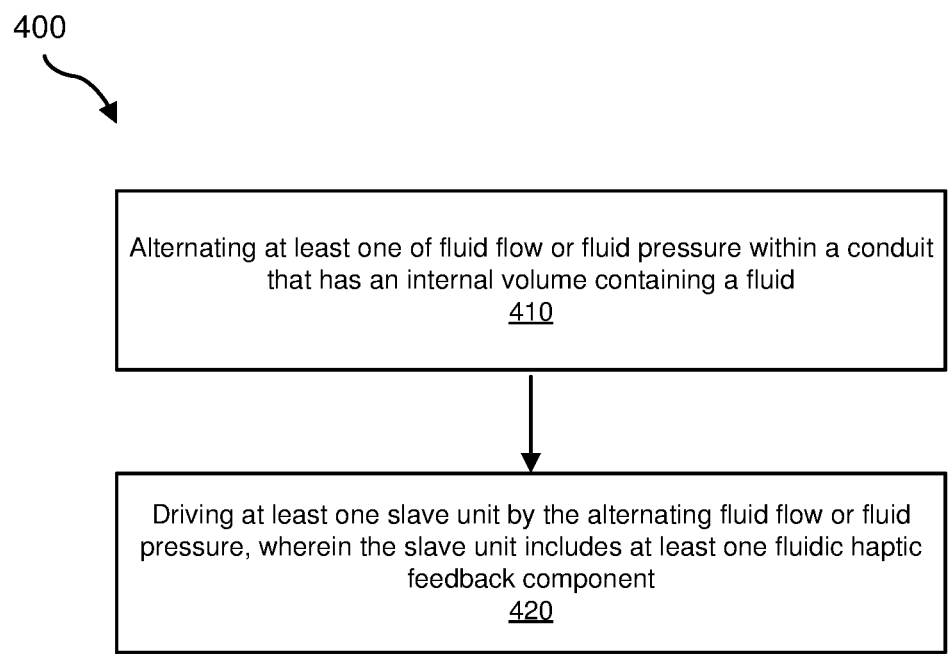
FIG. 4 is a flow diagram illustrating a method for driving operation of a haptic feedback system, according to at least one embodiment of the present disclosure.

FIG. 4 is a flow diagram illustrating a method 400 for driving operation of a haptic feedback system. At operation 410, at least one of fluid flow and/or fluid pressure within a conduit may be alternated (e.g., between different magnitudes, between different directions, and/or between positive and negative values). The conduit may have an internal volume containing a fluid, such as an incompressible fluid. Operation 410 may be performed in a variety of ways. For example, any of the example fluidic power mechanisms 300 described above may be employed to perform operation 410.

At operation 420, at least one slave unit may be driven by the alternating fluid flow and/or fluid pressure. The slave unit may include at least one fluidic haptic feedback component. Operation 420 may be performed in a variety of ways. For example, any of the fluidic power mechanisms 300 described above may be employed to perform operation 420. In addition, any of the example slave units 206 and/or fluidic haptic feedback component(s) 212 described above may be driven by the alternating fluid flow and/or fluid pressure.

Figure 5:
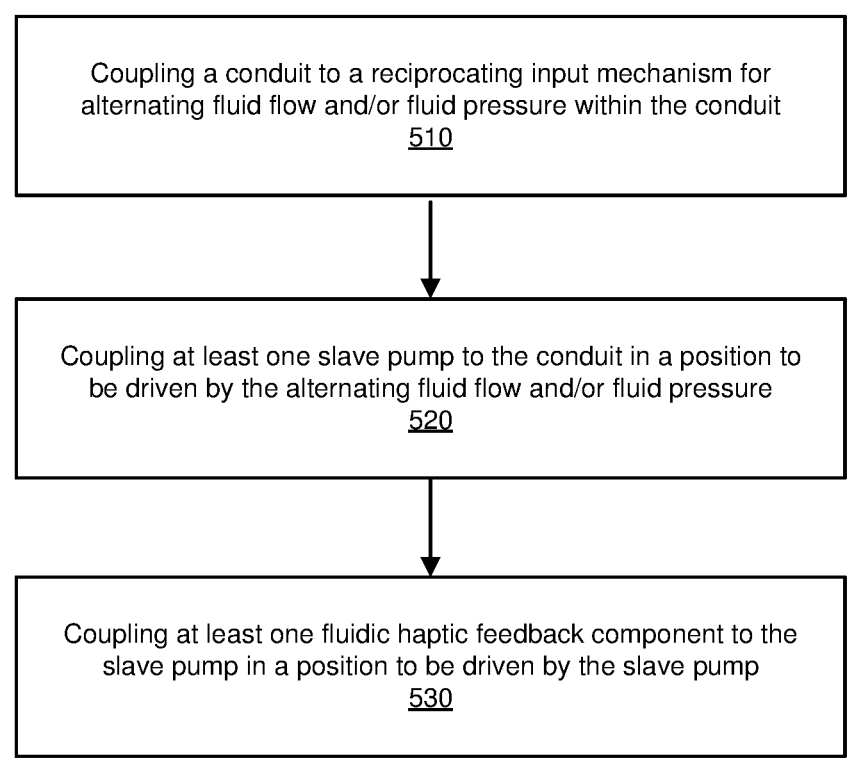
FIG. 5 is a flow diagram illustrating a method of manufacturing a haptic feedback system, according to at least one embodiment of the present disclosure.

FIG. 5 is a flow diagram illustrating a method 500 of manufacturing a haptic feedback system. At operation 510, a conduit may be coupled to a reciprocating input mechanism for alternating fluid flow and/or fluid pressure within the conduit. The conduit may have an internal volume, and the reciprocating input mechanism may be placed in fluid communication with the internal volume of the conduit. Operation 510 may be performed in a variety of ways. For example, any of the fluidic power mechanisms 300 described above may be employed as the reciprocating input mechanism to be coupled to the conduit.

At operation 520, at least one slave pump may be coupled to the conduit in a position to be driven by the alternating fluid flow and/or fluid pressure within the internal volume of the conduit. Operation 520 may be performed in a variety of ways. For example, any of the fluidic power mechanisms 300 described above may be employed as the slave pump (and/or as a portion of the slave pump) to be coupled to the conduit.

At operation 530, at least one fluidic haptic feedback component may be coupled to the slave pump in a position to be driven by the slave pump. Operation 530 may be performed in a variety of ways. For example, any of the example fluidic haptic feedback component(s) 212 described above may be coupled to the slave pump. In some embodiments, at least one electrical generator may be coupled to the slave pump in a configuration to generate an electrical current from the alternating fluid flow and/or fluid pressure within the internal volume of the conduit.

Accordingly, disclosed are various apparatuses, systems, and methods that may be employed to transmit fluidic power from a reciprocating input mechanism to a slave unit. The disclosed concepts may be employed to improve an efficiency (e.g., in size, energy consumption, speed, etc.) of power transmission in fluidics applications. For example, power may be drawn from an alternating fluid flow and/or fluid pressure in a conduit by a slave pump, which may be used to drive operation of a fluidic haptic feedback component. The various components (e.g., reciprocating input mechanism, conduit, slave pump, fluidic haptic feedback component, etc.) may be tailored (e.g., sized and configured) to generate and draw an appropriate amount of power for efficient operation in a variety of operational states. In some embodiments that implement the systems in wearable devices (e.g., for artificial-reality systems), the reciprocating input mechanism may be positioned remotely from the haptic feedback component(s), to support the power-generation components (e.g., the reciprocating input mechanism) on a part of the body that is less-sensitive to weight, while the relatively low-weight haptic feedback component(s) may be positioned in any convenient location for providing haptic feedback. The conduit may connect the reciprocating input mechanism and the haptic feedback component(s). In some embodiments, such a system may lack electrical wiring between the reciprocating input mechanism and the haptic feedback component(s), since sufficient power may be transmitted via the fluid within the conduit, rather than via electrical wiring.

Embodiments of the present disclosure may include or be implemented in conjunction with various types of artificial-reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 600 in FIG. 6. Other artificial-reality systems may include an NED that also provides visibility into the real world (e.g., augmented-reality system 700 in FIG. 7) or that visually immerses a user in an artificial reality (e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 6:
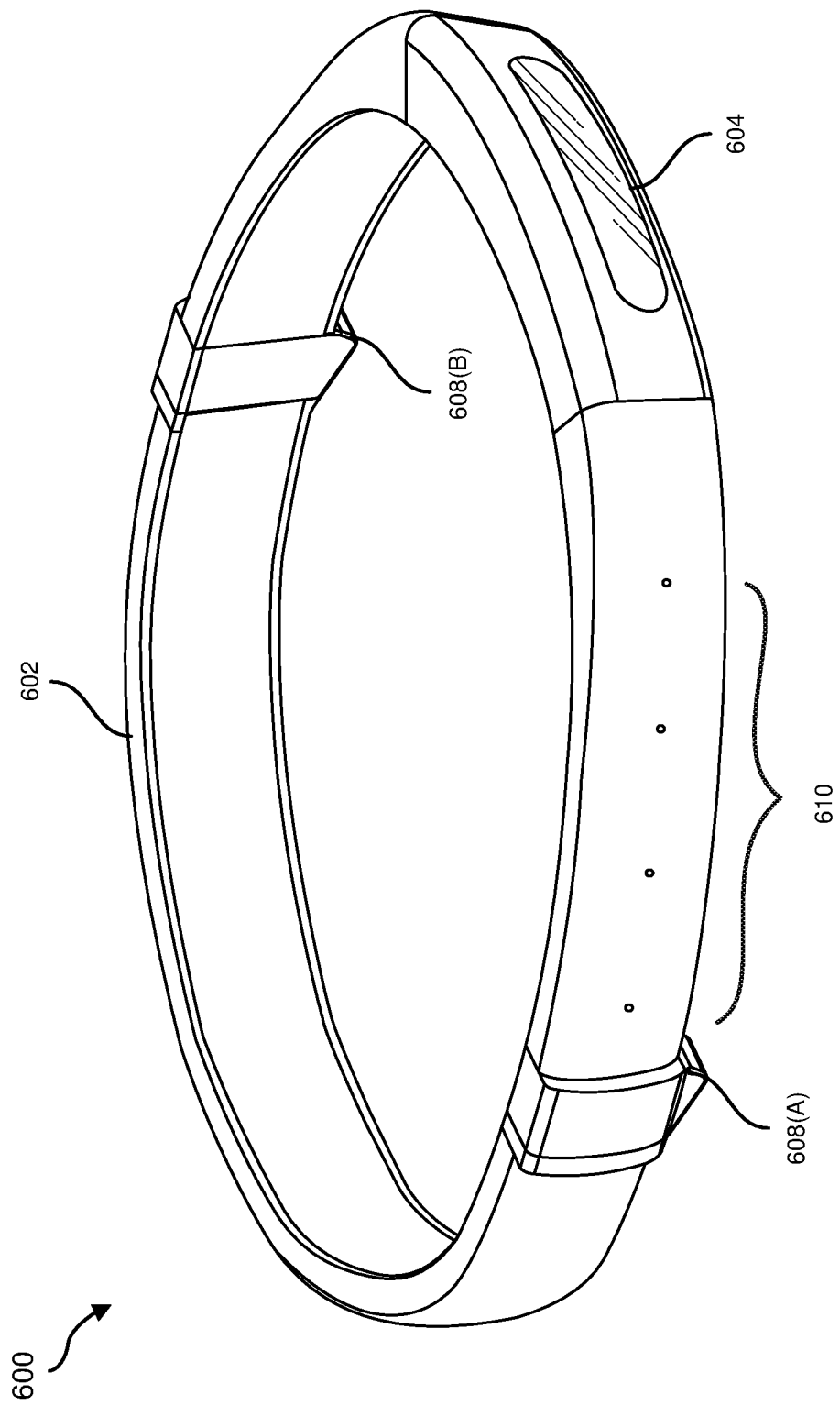
FIG. 6 is an illustration of an example artificial-reality headband that may be used in connection with embodiments of this disclosure.

Turning to FIG. 6, the augmented-reality system 600 generally represents a wearable device dimensioned to fit about a body part (e.g., a head) of a user. As shown in FIG. 6, the system 600 may include a frame 602 and a camera assembly 604 that is coupled to the frame 602 and configured to gather information about a local environment by observing the local environment. The augmented-reality system 600 may also include one or more audio devices, such as output audio transducers 608(A) and 608(B) and input audio transducers 610. The output audio transducers 608(A) and 608(B) may provide audio feedback and/or content to a user, and the input audio transducers 610 may capture audio in a user's environment.

As shown, the augmented-reality system 600 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the augmented-reality system 600 may not include an NED, augmented-reality system 600 may include other types of screens or visual feedback devices (e.g., a display screen integrated into a side of the frame 602).

Figure 7:
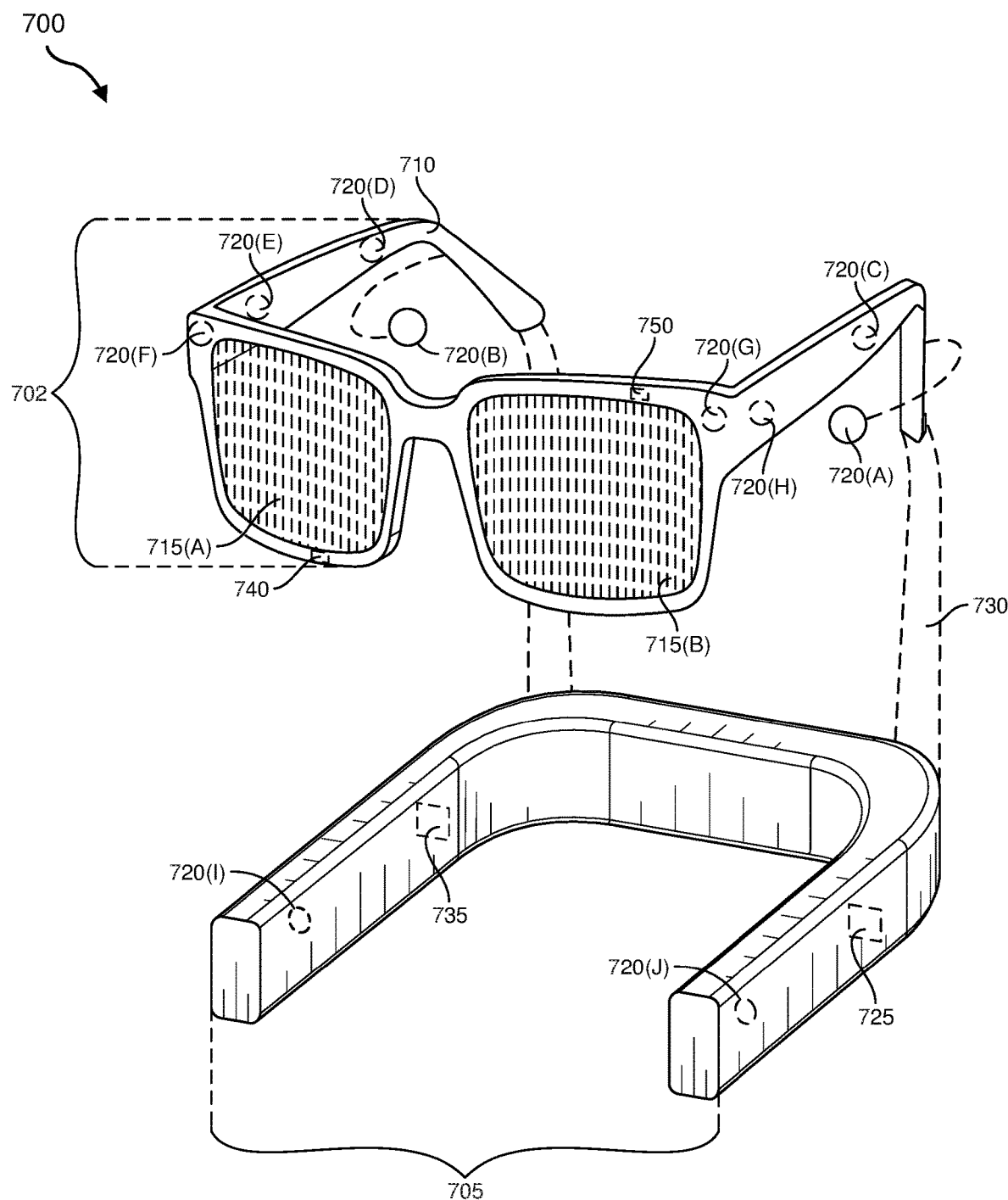
FIG. 7 is an illustration of example augmented-reality glasses that may be used in connection with embodiments of this disclosure.

The embodiments discussed in this disclosure may also be implemented in augmented-reality systems that include one or more NEDs. For example, as shown in FIG. 7, the augmented-reality system 700 may include an eyewear device 702 with a frame 710 configured to hold a left display device 715(A) and a right display device 715(B) in front of a user's eyes. The display devices 715(A) and 715(B) may act together or independently to present an image or series of images to a user. While the augmented-reality system 700 includes two displays, embodiments of this disclosure may be implemented in augmented-reality systems with a single NED or more than two NEDs.

In some embodiments, the augmented-reality system 700 may include one or more sensors, such as sensor 740. The sensor 740 may generate measurement signals in response to motion of the augmented-reality system 700 and may be located on substantially any portion of the frame 710. The sensor 740 may represent a position sensor, an inertial measurement unit (IMU), a depth camera assembly, or any combination thereof. In some embodiments, the augmented-reality system 700 may or may not include the sensor 740 or may include more than one sensor. In embodiments in which the sensor 740 includes an IMU, the IMU may generate calibration data based on measurement signals from the sensor 740. Examples of the sensor 740 may include, without limitation, accelerometers, gyroscopes, magnetometers, other suitable types of sensors that detect motion, sensors used for error correction of the IMU, or some combination thereof.

The augmented-reality system 700 may also include a microphone array with a plurality of acoustic transducers 720(A)-720(J), referred to collectively as acoustic transducers 720. The acoustic transducers 720 may be transducers that detect air pressure variations induced by sound waves. Each acoustic transducer 720 may be configured to detect sound and convert the detected sound into an electronic format (e.g., an analog or digital format). The microphone array in FIG. 7 may include, for example, ten acoustic transducers: 720(A) and 720(B), which may be designed to be placed inside a corresponding ear of the user, acoustic transducers 720(C), 720(D), 720(E), 720(F), 720(G), and 720(H), which may be positioned at various locations on the frame 710, and/or acoustic transducers 720(1) and 720(J), which may be positioned on a corresponding neckband 705.

In some embodiments, one or more of the acoustic transducers 720(A)-(F) may be used as output transducers (e.g., speakers). For example, the acoustic transducers 720(A) and/or 720(B) may be earbuds or any other suitable type of headphone or speaker.

The configuration of the acoustic transducers 720 of the microphone array may vary. While the augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on the frame 710, an orientation associated with each acoustic transducer 720, or some combination thereof.

The acoustic transducers 720(A) and 720(B) may be positioned on different parts of the user's ear, such as behind the pinna or within the auricle or fossa. Or, there may be additional acoustic transducers 720 on or surrounding the ear in addition to the acoustic transducers 720 inside the ear canal. Having an acoustic transducer 720 positioned next to an ear canal of a user may enable the microphone array to collect information on how sounds arrive at the ear canal. By positioning at least two of the acoustic transducers 720 on either side of a user's head (e.g., as binaural microphones), the augmented-reality device 700 may simulate binaural hearing and capture a 3D stereo sound field around about a user's head. In some embodiments, the acoustic transducers 720(A) and 720(B) may be connected to the augmented-reality system 700 via a wired connection 730, and in other embodiments, the acoustic transducers 720(A) and 720(B) may be connected to the augmented-reality system 700 via a wireless connection (e.g., a Bluetooth connection). In still other embodiments, the acoustic transducers 720(A) and 720(B) may not be used at all in conjunction with the augmented-reality system 700.

The acoustic transducers 720 on the frame 710 may be positioned along the length of the temples, across the bridge, above or below the display devices 715(A) and 715(B), or some combination thereof. The acoustic transducers 720 may be oriented such that the microphone array is able to detect sounds in a wide range of directions surrounding the user wearing the augmented-reality system 700. In some embodiments, an optimization process may be performed during manufacturing of the augmented-reality system 700 to determine relative positioning of each acoustic transducer 720 in the microphone array.

In some examples, the augmented-reality system 700 may include or be connected to an external device (e.g., a paired device), such as the neckband 705. The neckband 705 generally represents any type or form of paired device. Thus, the following discussion of the neckband 705 may also apply to various other paired devices, such as charging cases, smart watches, smart phones, wrist bands, other wearable devices, hand-held controllers, tablet computers, laptop computers and other external compute devices, etc.

As shown, the neckband 705 may be coupled to the eyewear device 702 via one or more connectors. The connectors may be wired or wireless and may include electrical and/or non-electrical (e.g., structural) components. In some cases, the eyewear device 702 and the neckband 705 may operate independently without any wired or wireless connection between them. While FIG. 7 illustrates the components of the eyewear device 702 and the neckband 705 in example locations on the eyewear device 702 and the neckband 705, the components may be located elsewhere and/or distributed differently on the eyewear device 702 and/or the neckband 705. In some embodiments, the components of the eyewear device 702 and the neckband 705 may be located on one or more additional peripheral devices paired with the eyewear device 702, the neckband 705, or some combination thereof.

Pairing external devices, such as the neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 700 may be provided by a paired device or shared between a paired device and an eyewear device, thus reducing the weight, heat profile, and form factor of the eyewear device overall while still retaining desired functionality. For example, the neckband 705 may allow components that would otherwise be included on an eyewear device to be included in the neckband 705 since users may tolerate a heavier weight load on their shoulders than they would tolerate on their heads. The neckband 705 may also have a larger surface area over which to diffuse and disperse heat to the ambient environment. Thus, the neckband 705 may allow for greater battery and computation capacity than might otherwise have been possible on a standalone eyewear device. Since weight carried in the neckband 705 may be less invasive to a user than weight carried in the eyewear device 702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 705 may be communicatively coupled with the eyewear device 702 and/or to other devices. These other devices may provide certain functions (e.g., tracking, localizing, depth mapping, processing, storage, etc.) to the augmented-reality system 700. In the embodiment of FIG. 7, the neckband 705 may include two acoustic transducers (e.g., 720(1) and 720(J)) that are part of the microphone array (or potentially form their own microphone subarray). The neckband 705 may also include a controller 725 and a power source 735.

The acoustic transducers 720(1) and 720(J) of the neckband 705 may be configured to detect sound and convert the detected sound into an electronic format (analog or digital). In the embodiment of FIG. 7, the acoustic transducers 720(1) and 720(J) may be positioned on the neckband 705, thereby increasing the distance between the neckband acoustic transducers 720(1) and 720(J) and other acoustic transducers 720 positioned on the eyewear device 702. In some cases, increasing the distance between the acoustic transducers 720 of the microphone array may improve the accuracy of beamforming performed via the microphone array. For example, if a sound is detected by the acoustic transducers 720(C) and 720(D) and the distance between the acoustic transducers 720(C) and 720(D) is greater than, e.g., the distance between the acoustic transducers 720(D) and 720(E), the determined source location of the detected sound may be more accurate than if the sound had been detected by the acoustic transducers 720(D) and 720(E).

The controller 725 of the neckband 705 may process information generated by the sensors on the neckband 705 and/or the augmented-reality system 700. For example, the controller 725 may process information from the microphone array that describes sounds detected by the microphone array. For each detected sound, the controller 725 may perform a direction-of-arrival (DOA) estimation to estimate a direction from which the detected sound arrived at the microphone array. As the microphone array detects sounds, the controller 725 may populate an audio data set with the information. In embodiments in which the augmented-reality system 700 includes an inertial measurement unit, the controller 725 may compute all inertial and spatial calculations from the IMU located on the eyewear device 702. A connector may convey information between the augmented-reality system 700 and the neckband 705 and between the augmented-reality system 700 and the controller 725. The information may be in the form of optical data, electrical data, wireless data, or any other transmittable data form. Moving the processing of information generated by the augmented-reality system 700 to the neckband 705 may reduce weight and heat in the eyewear device 702, making it more comfortable to the user.

The power source 735 in the neckband 705 may provide power to the eyewear device 702 and/or to the neckband 705. The power source 735 may include, without limitation, lithium ion batteries, lithium-polymer batteries, primary lithium batteries, alkaline batteries, or any other form of power storage. In some cases, the power source 735 may be a wired power source. Including the power source 735 on the neckband 705 instead of on the eyewear device 702 may help better distribute the weight and heat generated by the power source 735.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality system 800 in FIG. 8, that mostly or completely covers a user's field of view. The virtual-reality system 800 may include a front rigid body 802 and a band 804 shaped to fit around a user's head. The virtual-reality system 800 may also include output audio transducers 806(A) and 806(B). Furthermore, while not shown in FIG. 8, the front rigid body 802 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in the augmented-reality system 700 and/or the virtual-reality system 800 may include one or more liquid crystal displays (LCDs), light-emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in the augmented-reality system 700 and/or the virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the augmented-reality system 600, the augmented-reality system 700, and/or the virtual-reality system 800 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 6 and 8, the output audio transducers 608(A), 608(B), 806(A), and 806(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 610 may include condenser microphones, dynamic microphones, ribbon microphones, and/or any other type or form of input transducer. In some embodiments, a single transducer may be used for both audio input and audio output.

Figure 8:
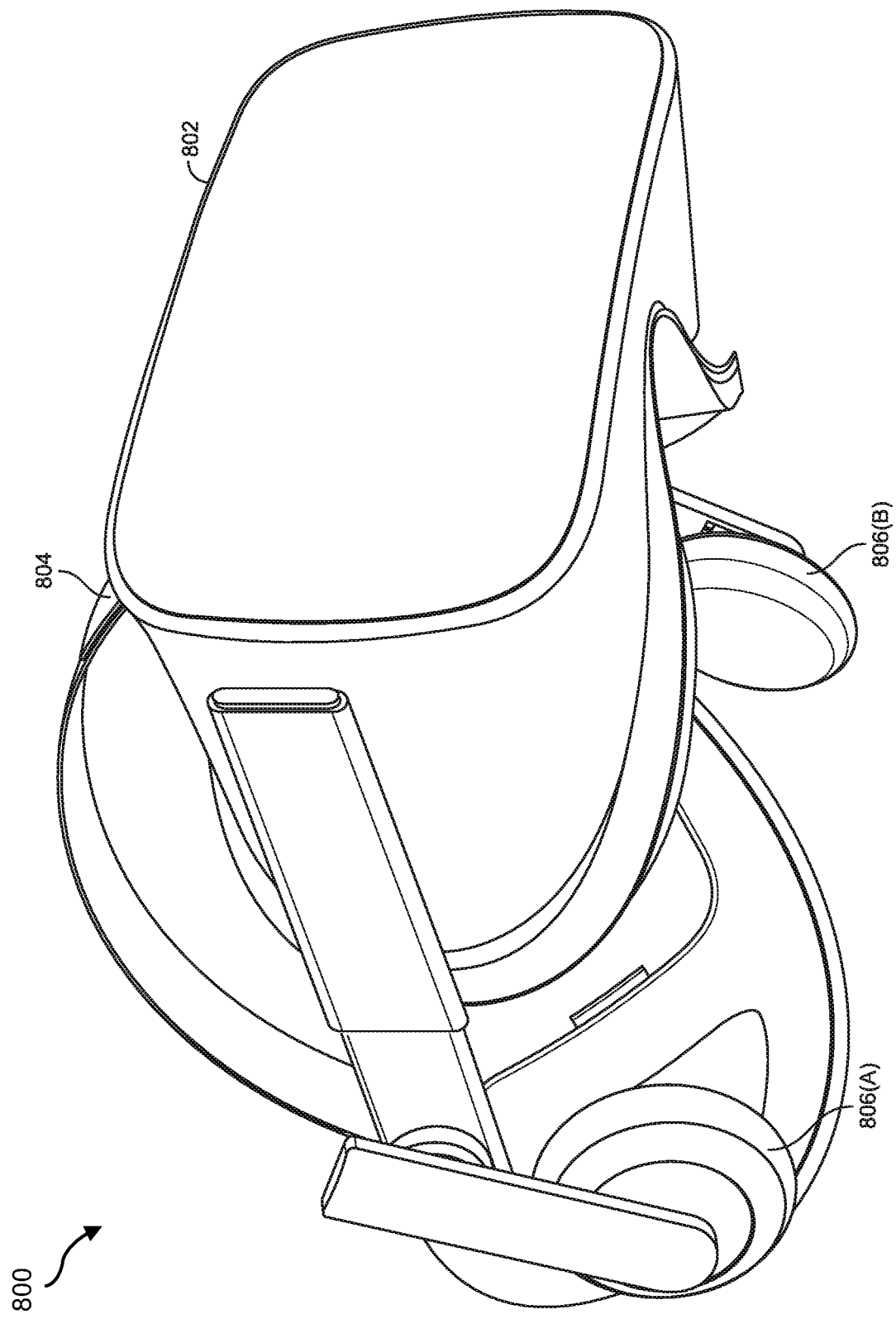
FIG. 8 is an illustration of an example virtual-reality headset that may be used in connection with embodiments of this disclosure.

While not shown in FIGS. 6-8, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, the artificial-reality systems 600, 700, and 800 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 9:
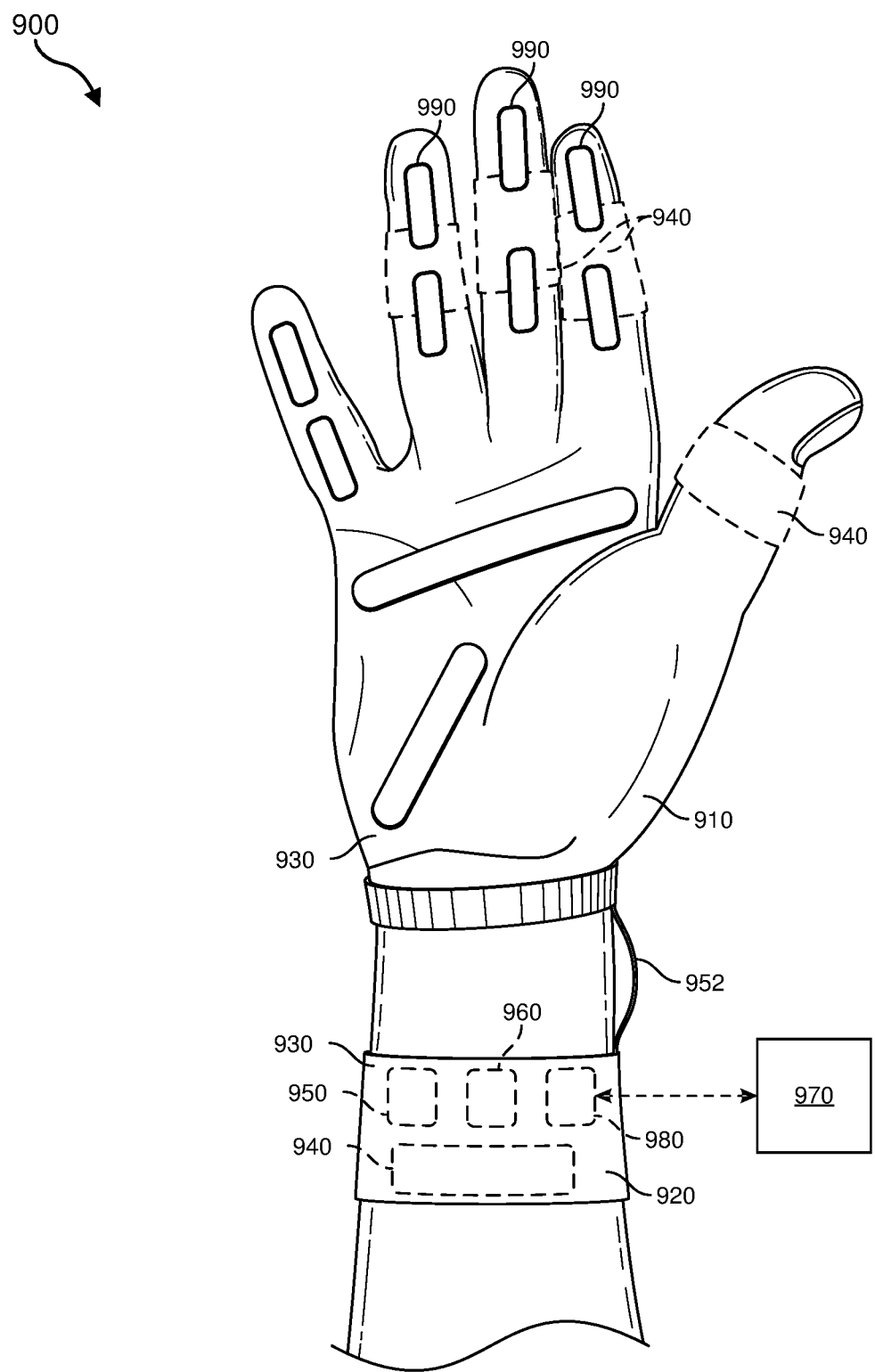
FIG. 9 is an illustration of example haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 9 illustrates a vibrotactile system 900 in the form of a wearable glove (haptic device 910) and wristband (haptic device 920). The haptic device 910 and the haptic device 920 are shown as examples of wearable devices that include a flexible, wearable textile material 930 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 940 may be positioned at least partially within one or more corresponding pockets formed in the textile material 930 of the vibrotactile system 900. The vibrotactile devices 940 may be positioned in locations to provide a vibrating sensation (e.g., haptic feedback) to a user of the vibrotactile system 900. For example, the vibrotactile devices 940 may be positioned to be against the user's finger(s), thumb, or wrist, as shown in FIG. 9. The vibrotactile devices 940 may, in some examples, be sufficiently flexible to conform to or bend with the user's corresponding body part(s).

A power source 950 (e.g., a battery) for applying a voltage to the vibrotactile devices 940 for activation thereof may be electrically coupled to the vibrotactile devices 940, such as via conductive wiring 952. In some examples, each of the vibrotactile devices 940 may be independently electrically coupled to the power source 950 for individual activation. In some embodiments, a processor 960 may be operatively coupled to the power source 950 and configured (e.g., programmed) to control activation of the vibrotactile devices 940.

The vibrotactile system 900 may be implemented in a variety of ways. In some examples, the vibrotactile system 900 may be a standalone system with integral subsystems and components for operation independent of other devices and systems. As another example, the vibrotactile system 900 may be configured for interaction with another device or system 970. For example, the vibrotactile system 900 may, in some examples, include a communications interface 980 for receiving and/or sending signals to the other device or system 970. The other device or system 970 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. The communications interface 980 may enable communications between the vibrotactile system 900 and the other device or system 970 via a wireless (e.g., Wi-Fi, Bluetooth, cellular, radio, etc.) link or a wired link. If present, the communications interface 980 may be in communication with the processor 960, such as to provide a signal to the processor 960 to activate or deactivate one or more of the vibrotactile devices 940.

The vibrotactile system 900 may optionally include other subsystems and components, such as touch-sensitive pads 990, pressure sensors, motion sensors, position sensors, lighting elements, and/or user interface elements (e.g., an on/off button, a vibration control element, etc.). During use, the vibrotactile devices 940 may be configured to be activated for a variety of different reasons, such as in response to the user's interaction with user interface elements, a signal from the motion or position sensors, a signal from the touch-sensitive pads 990, a signal from the pressure sensors, a signal from the other device or system 970, etc.

Although the power source 950, the processor 960, and the communications interface 980 are illustrated in FIG. 9 as being positioned in the haptic device 920, the present disclosure is not so limited. For example, one or more of the power source 950, the processor 960, or the communications interface 980 may be positioned within the haptic device 910 or within another wearable textile.

Figure 10:
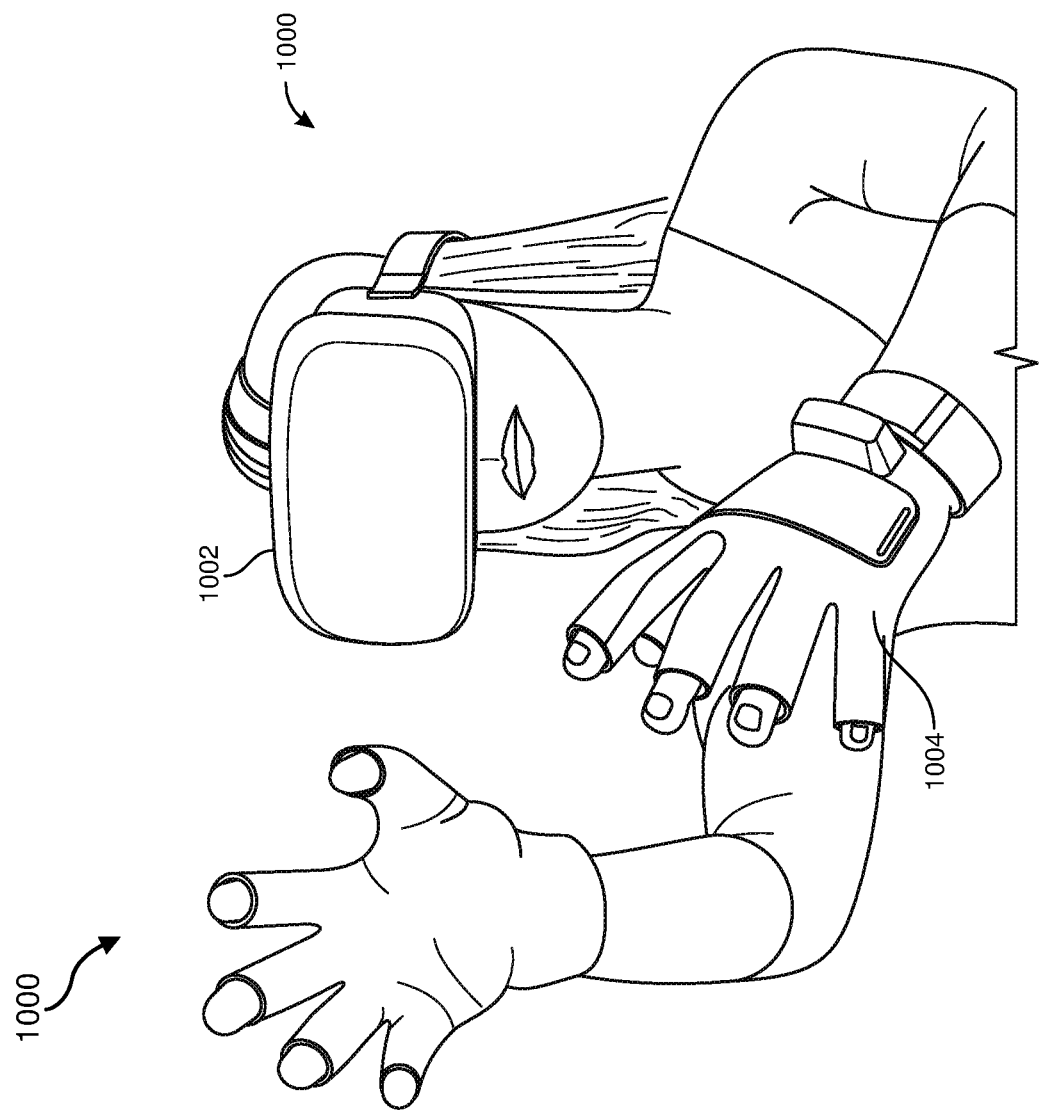
FIG. 10 is an illustration of an example virtual-reality environment according to embodiments of this disclosure.

Haptic wearables, such as those shown in and described in connection with FIG. 9, may be implemented in a variety of types of artificial-reality systems and environments. FIG. 10 shows an example artificial-reality environment 1000 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 1002 generally represents any type or form of virtual-reality system, such as the virtual-reality system 800 in FIG. 8. Haptic device 1004 generally represents any type or form of wearable device, worn by a use of an artificial-reality system, that provides haptic feedback to the user to give the user the perception that he or she is physically engaging with a virtual object. In some embodiments, the haptic device 1004 may provide haptic feedback by applying vibration, motion, and/or force to the user. For example, the haptic device 1004 may limit or augment a user's movement. To give a specific example, the haptic device 1004 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use the haptic device 1004 to send action requests to a console. Examples of action requests include, without limitation, requests to start an application and/or end the application and/or requests to perform a particular action within the application.

Figure 11:
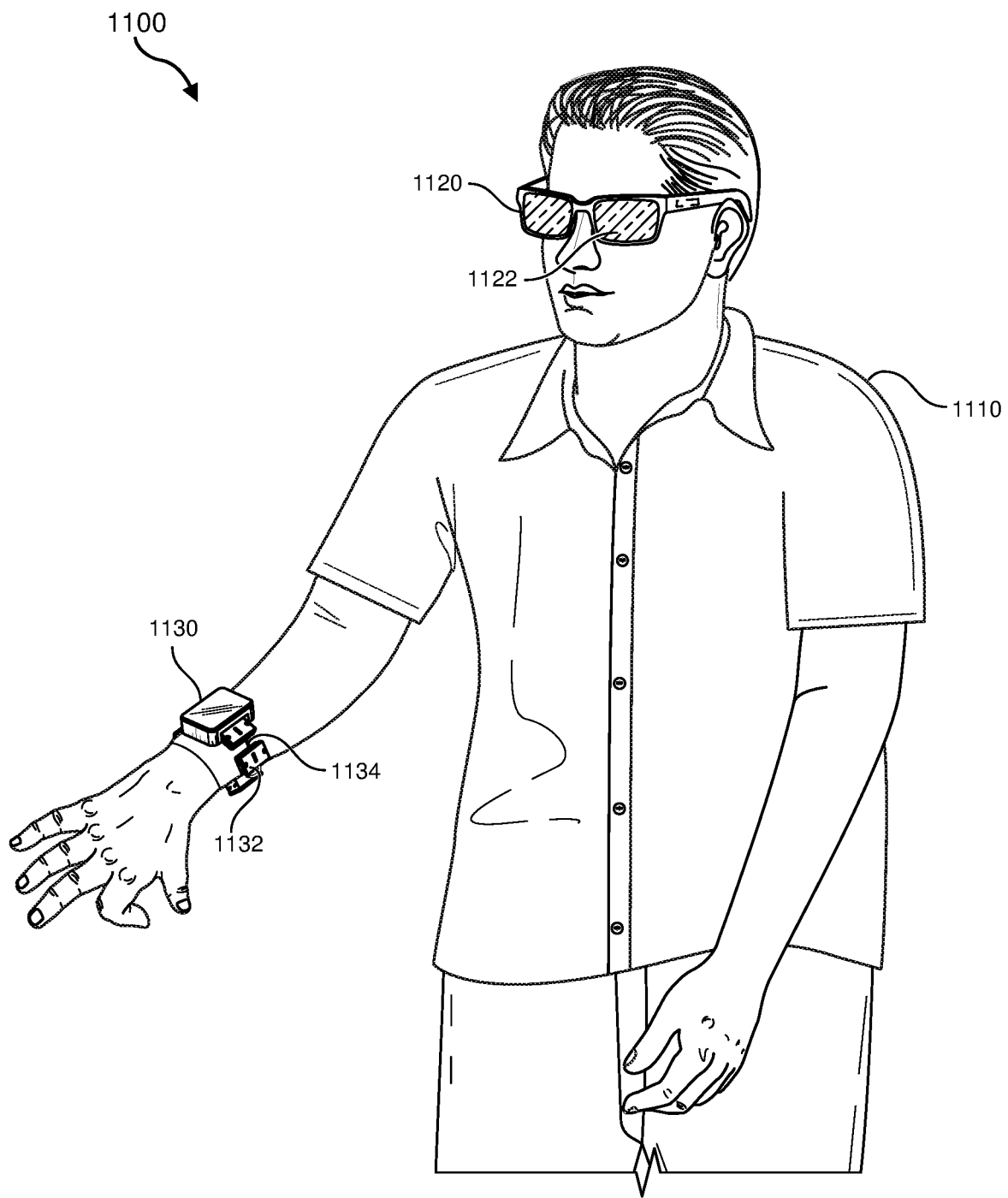
FIG. 11 is an illustration of an example augmented-reality environment according to embodiments of this disclosure.

While haptic interfaces may be used with virtual-reality systems, as shown in FIG. 10, haptic interfaces may also be used with augmented-reality systems, as shown in FIG. 11. FIG. 11 is a perspective view a user 1110 interacting with an augmented-reality system 1100. In this example, the user 1110 may wear a pair of augmented-reality glasses 1120 that have one or more displays 1122 and that are paired with a haptic device 1130. The haptic device 1130 may be a wristband that includes a plurality of band elements 1132 and a tensioning mechanism 1134 that connects band elements 1132 to one another.

One or more of the band elements 1132 may include any type or form of actuator suitable for providing haptic feedback. For example, one or more of the band elements 1132 may be configured to provide one or more of various types of cutaneous feedback, including vibration, force, traction, texture, and/or temperature. To provide such feedback, the band elements 1132 may include one or more of various types of actuators. In one example, each of the band elements 1132 may include a vibrotactor (e.g., a vibrotactile actuator) configured to vibrate in unison or independently to provide one or more of various types of haptic sensations to a user. Alternatively, only a single band element or a subset of band elements may include vibrotactors.

The haptic devices 910, 920, 1004, and 1130 may include any suitable number and/or type of haptic transducer, sensor, and/or feedback mechanism. For example, the haptic devices 910, 920, 1004, and 1130 may include one or more mechanical transducers, piezoelectric transducers, and/or fluidic transducers. The haptic devices 910, 920, 1004, and 1130 may also include various combinations of different types and forms of transducers that work together or independently to enhance a user's artificial-reality experience. In one example, each of the band elements 1132 of the haptic device 1130 may include a vibrotactor (e.g., a vibrotactile actuator) configured to vibrate in unison or independently to provide one or more of various types of haptic sensations to a user.

By way of non-limiting examples, the following embodiments are included in the present disclosure.

Example 1: A fluidic power transmission apparatus, including a conduit having an internal volume for containing a fluid; a reciprocating input mechanism for alternating at least one of fluid flow or fluid pressure within the conduit, the reciprocating input mechanism being in fluid communication within the conduit, the reciprocating input mechanism being in fluid communication with the internal volume of the conduit; and a slave unit coupled to the conduit such that the slave unit is positioned to be driven by the alternating fluid flow or fluid pressure within the internal volume of the conduit.

Example 2: The fluidic power transmission apparatus of Example 1, wherein: the slave unit includes a slave pump and a fluidic haptic feedback component configured to be driven by the slave pump; and the fluidic haptic feedback component is configured to provide haptic feedback to a user.

Example 3: The fluidic power transmission apparatus of Example 2, wherein the fluidic haptic feedback component includes at least one of: a haptic bubble array; a skin-stretch mechanism; or a haptic vibrotactor.

Example 4: The fluidic power transmission apparatus of any of Examples 1 through 3, further including at least one fluidic control subsystem coupled to the slave unit for controlling operation of the slave unit.

Example 5: The fluidic power transmission apparatus of any of Examples 1 through 4, wherein the reciprocating input mechanism includes at least one piston movable within at least one fluid chamber.

Example 6: The fluidic power transmission apparatus of Example 5, wherein the at least one piston includes a magnetic material, wherein the reciprocating input mechanism further includes a magnetic driving element adjacent to the fluid chamber.

Example 7: The fluidic power transmission apparatus of Example 6, wherein the magnetic driving element includes at least one of: a permanent magnet; a ferromagnetic material; an electromagnet; or an electromagnetic coil.

Example 8: The fluidic power transmission apparatus of any of Examples 5 through 7, wherein the at least one piston and the at least one fluid chamber include a first piston positioned within and movable relative to a first fluid chamber and a second piston positioned within and movable relative to a second fluid chamber.

Example 9: The fluidic power transmission apparatus of any of Examples 5 through 8, wherein the reciprocating input mechanism further includes a flexible seal coupling and sealing the piston to an interior surface of the fluid chamber.

Example 10: The fluidic power transmission apparatus of any of Examples 1 through 9, wherein the reciprocating input mechanism includes at least one flexible endplate capping at least one respective enlarged fluid chamber.

Example 11: The fluidic power transmission apparatus of any of Examples 1 through 10, wherein the reciprocating input mechanism includes a compressible tube and at least one roller for compressing the compressible tube.

Example 12: The fluidic power transmission apparatus of any of Examples 1 through 11, wherein the fluid contained by the conduit includes an incompressible fluid.

Example 13: The fluidic power transmission apparatus of any of Examples 1 through 12, wherein the conduit includes a fluidic circuit including a first conduit segment extending from a first fluid port of the reciprocating input mechanism to the slave unit and a second conduit segment extending from the slave unit to a second fluid port of the reciprocating input mechanism.

Example 14: The fluidic power transmission apparatus of Example 13, wherein a first internal volume of the first conduit segment and a second internal volume of the second conduit segment are fluidically isolated from each other.

Example 15: The fluidic power transmission apparatus of any of Examples 1 through 14, wherein the conduit includes a composite material including a polymer and a textile.

Example 16: The fluidic power transmission apparatus of any of Examples 1 through 15, further including a pressure sensor coupled to the conduit for sensing a fluid pressure within the internal volume of the conduit.

Example 17: A method of manufacturing a haptic feedback system, including: coupling a conduit having an internal volume containing a fluid to a reciprocating input mechanism for alternating at least one of fluid flow or fluid pressure within the conduit, such that the reciprocating input mechanism is in fluid communication with the internal volume of the conduit; coupling at least one slave pump to the conduit in a position to be driven by the alternating fluid flow or fluid pressure within the internal volume of the conduit; and coupling at least one fluidic haptic feedback component to the slave pump in a position to be driven by the slave pump.

Example 18: The method of Example 17, further including coupling at least one electrical generator to the slave pump in a configuration to generate an electrical current from the alternating fluid flow or fluid pressure within the internal volume of the conduit.

Example 19: A method for driving operation of a haptic feedback system, including: alternating, with a reciprocating input mechanism, at least one of fluid flow or fluid pressure within a conduit that has an internal volume containing a fluid; and driving at least one slave unit by the alternating fluid flow or fluid pressure within the internal volume of the conduit, wherein the slave unit includes at least one fluidic haptic feedback component.

Example 20: The method of Example 19, wherein driving the slave unit includes moving at least one piston within at least one fluid chamber in response to actuation of the reciprocating input mechanism.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A fluidic power transmission apparatus, comprising:
a conduit having an internal volume for containing a fluid;
a reciprocating input mechanism for alternating at least one of fluid flow or fluid pressure within the conduit, the reciprocating input mechanism being in fluid communication with the internal volume of the conduit; and
a slave unit coupled to the conduit such that the slave unit is positioned to be driven by the alternating fluid flow or fluid pressure within the internal volume of the conduit; and
a fluidic haptic feedback component configured to be driven by the slave unit,
wherein:
the conduit comprises a fluidic circuit including a first conduit segment extending from a first fluid port of the reciprocating input mechanism to the slave unit and a second conduit segment extending from the slave unit to a second fluid port of the reciprocating input mechanism.

2. The fluidic power transmission apparatus of claim 1, wherein:
the slave unit comprises a slave pump and the fluidic haptic feedback component is configured to be driven by the slave pump; and
the fluidic haptic feedback component is configured to provide haptic feedback to a user.

3. The fluidic power transmission apparatus of claim 1, wherein the fluidic haptic feedback component comprises at least one of:
a haptic bubble array;
a skin-stretch mechanism; or
a haptic vibrotactor.

4. The fluidic power transmission apparatus of claim 1, further comprising at least one fluidic control subsystem coupled to the slave unit for controlling operation of the slave unit.

5. The fluidic power transmission apparatus of claim 1, wherein the reciprocating input mechanism comprises at least one piston movable within at least one fluid chamber.

6. The fluidic power transmission apparatus of claim 5, wherein the at least one piston comprises a magnetic material, wherein the reciprocating input mechanism further comprises a magnetic driving element adjacent to the fluid chamber.

7. The fluidic power transmission apparatus of claim 6, wherein the magnetic driving element comprises at least one of:
a permanent magnet;
a ferromagnetic material;
an electromagnet; or
an electromagnetic coil.

8. The fluidic power transmission apparatus of claim 5, wherein the at least one piston and the at least one fluid chamber comprise a first piston positioned within and movable relative to a first fluid chamber and a second piston positioned within and movable relative to a second fluid chamber.

9. The fluidic power transmission apparatus of claim 5, wherein the reciprocating input mechanism further comprises a flexible seal coupling and sealing the piston to an interior surface of the fluid chamber.

10. The fluidic power transmission apparatus of claim 1, wherein the reciprocating input mechanism comprises at least one flexible endplate capping at least one respective enlarged fluid chamber.

11. The fluidic power transmission apparatus of claim 1, wherein the reciprocating input mechanism comprises a compressible tube and at least one roller for compressing the compressible tube.

12. The fluidic power transmission apparatus of claim 1, wherein the fluid contained by the conduit comprises an incompressible fluid.

13. The fluidic power transmission apparatus of claim 1, wherein a first internal volume of the first conduit segment and a second internal volume of the second conduit segment are fluidically isolated from each other.

14. The fluidic power transmission apparatus of claim 1, wherein the conduit comprises a composite material including a polymer and a textile.

15. The fluidic power transmission apparatus of claim 1, further comprising a pressure sensor coupled to the conduit for sensing a fluid pressure within the internal volume of the conduit.

16. A fluidic system, comprising:
a conduit having an internal volume containing fluid;
a reciprocating input mechanism coupled to and in fluid communication with the internal volume of the conduit, the reciprocating input mechanism configured for alternating at least one of fluid flow or fluid pressure within the conduit;
at least one slave pump coupled to the conduit in a position to be driven by alternating the fluid flow or fluid pressure within the internal volume of the conduit; and
at least one electrical generator coupled to the slave pump in a configuration to generate an electrical current from the alternating fluid flow or fluid pressure within the internal volume of the conduit.

17. The fluidic system of claim 16, further comprising at least one fluidic haptic feedback component coupled to the slave pump in a position to be driven by the slave pump.

18. A fluidic device, comprising:
a conduit having an internal volume for containing a fluid;
a reciprocating input mechanism for alternating at least one of fluid flow or fluid pressure within the conduit, the reciprocating input mechanism being in fluid communication with the internal volume of the conduit;
a slave unit coupled to the conduit such that the slave unit is positioned to be driven by the alternating fluid flow or fluid pressure within the internal volume of the conduit; and
a pressure sensor coupled to the conduit for sensing a fluid pressure within the internal volume of the conduit.

19. The fluidic device of claim 18, wherein the reciprocating input mechanism comprises a first piston positioned within and movable relative to a first fluid chamber and a second piston positioned within and movable relative to a second fluid chamber.

20. The fluidic device of claim 18, wherein the reciprocating input mechanism comprises at least one flexible endplate capping at least one respective enlarged fluid chamber.

* * * * *